United States Patent [19]

Esposito

[11] Patent Number: 4,817,243
[45] Date of Patent: Apr. 4, 1989

[54] CRUSTACEAN MEAT EXTRACTOR

[76] Inventor: Ralph J. Esposito, 8040 Chef Menteur Hwy., New Orleans, La. 70126

[21] Appl. No.: 152,491

[22] Filed: Feb. 5, 1988

[51] Int. Cl.⁴ .............................................. A22C 29/02
[52] U.S. Cl. .......................................... 17/48; 17/51; 17/72; 17/73
[58] Field of Search .......................... 17/48, 51, 72, 73

[56] References Cited

U.S. PATENT DOCUMENTS

| 3,221,363 | 12/1965 | Couret | 17/73 X |
| 4,528,720 | 7/1985 | Young et al. | 17/51 X |

FOREIGN PATENT DOCUMENTS

| 152436 | 7/1953 | Australia | 17/72 |
| 1542403 | 3/1979 | United Kingdom | 17/72 |

Primary Examiner—Willie G. Abercrombie
Attorney, Agent, or Firm—Fleit, Jacobson, Cohn & Price

[57] ABSTRACT

An enclosure is provided in which a crab shell part having exposed meat cavities may be held in alignment with selectively operable water jet discharge structure for the purpose of extracting the meat from the shell cavities. Different crab shell portions may be variously cut to expose the meat containing cavities thereof to enable substantially total extraction of meat from the shell cavities. In addition, selectively movable abutment surface structure may be mounted adjacent the water jet discharge structure and utilized to manually stationarily support the tail of a crayfish in precise position for discharging a jet of water into the vent of the crayfish tail to thereby forceable eject meat from the crayfish tail, the abutment surface having a sharpened blade point operatively associated therewith and positioned to open and clean the vein of the crayfish tail as the meat is ejected from the shell thereof.

10 Claims, 3 Drawing Sheets

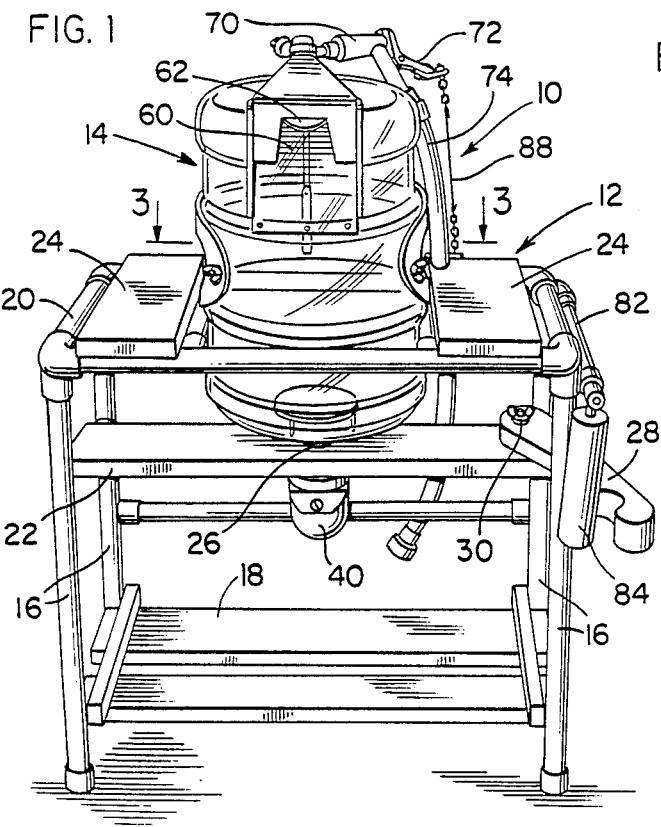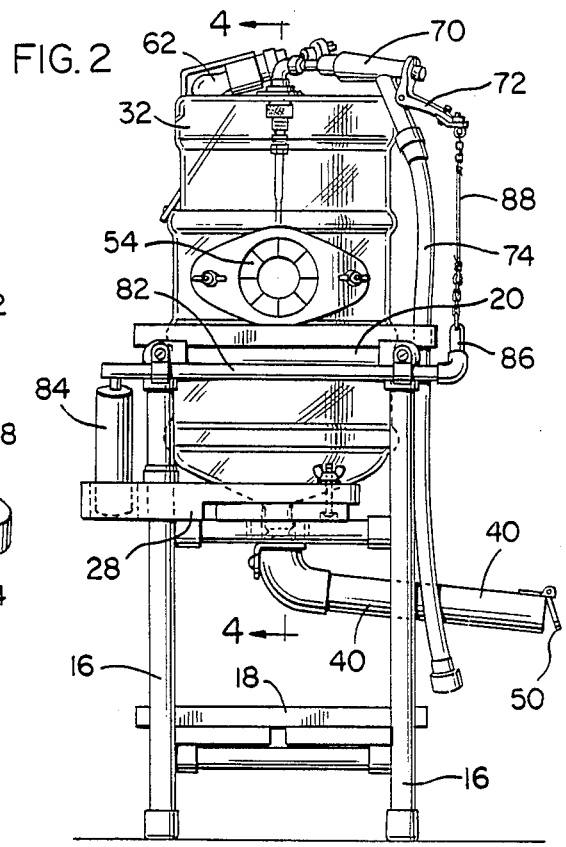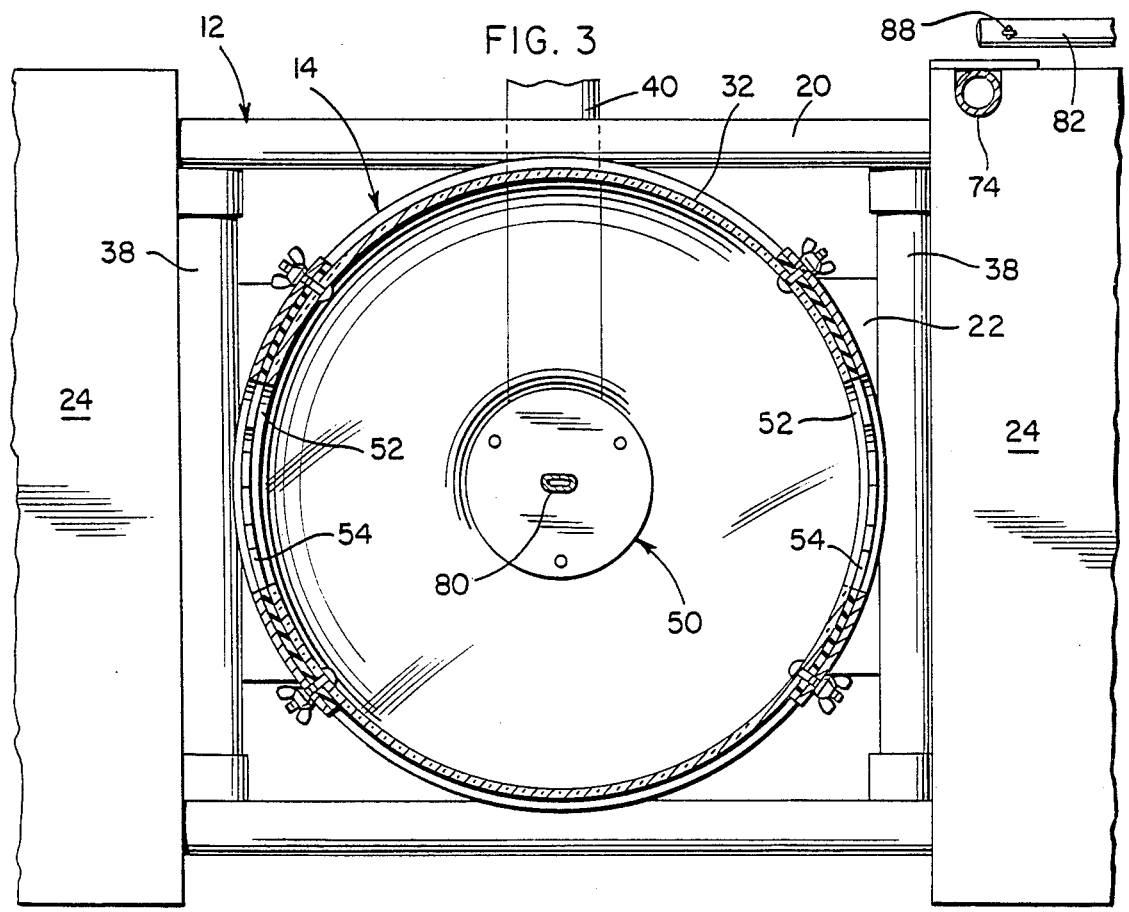

U.S. Patent    Apr. 4, 1989    Sheet 2 of 3    4,817,243
FIG. 4
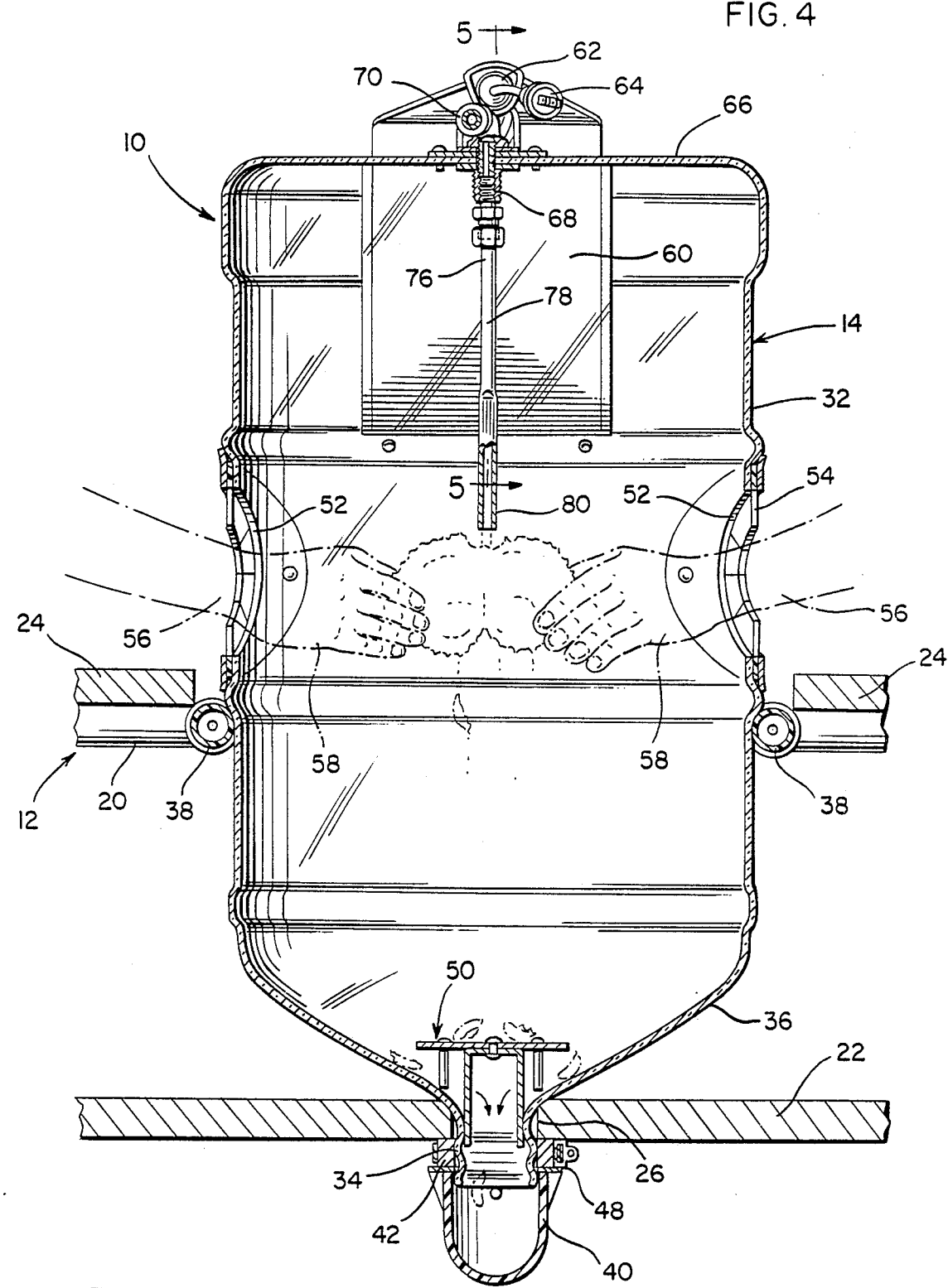
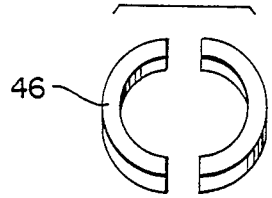
FIG. 6

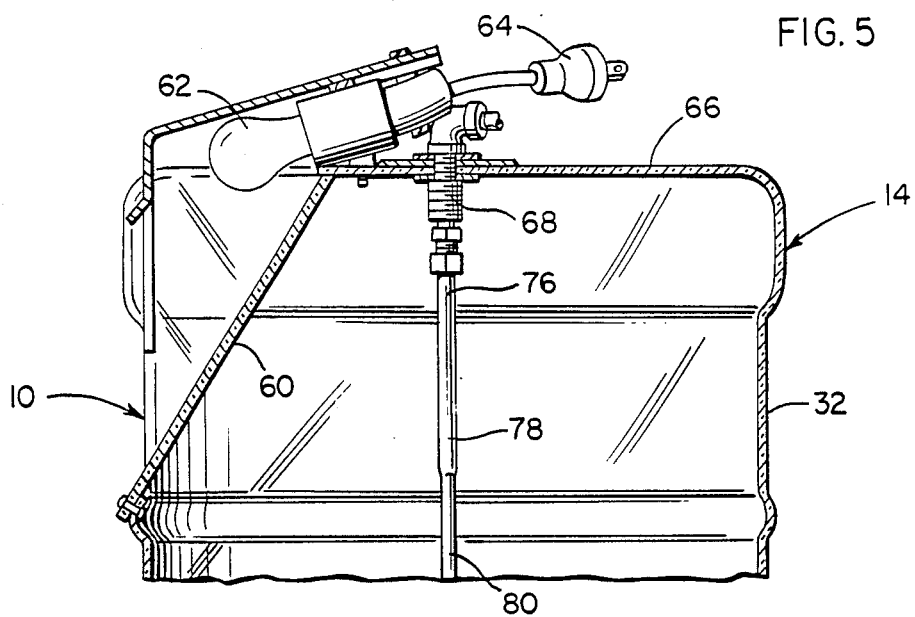
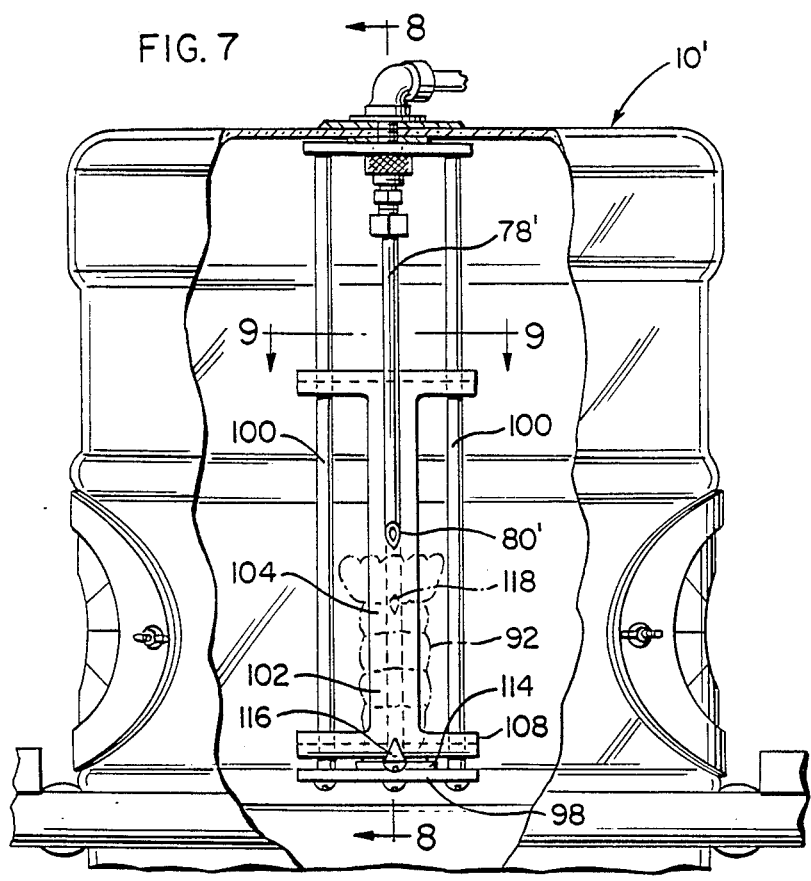
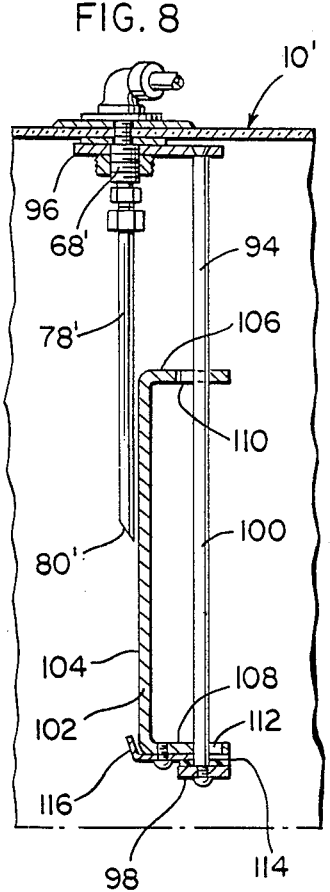
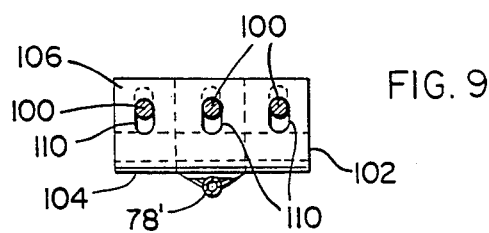

CRUSTACEAN MEAT EXTRACTOR

BACKGROUND OF THE INVENTION

1. Field of the Invention

Considerable time and expense is involved in various known methods for effective meat removal from crustacean shells. The meat from crabs such as bluecrabs and other crustaceans such as crayfish often is marketed as extracted from the shells of crustaceans and there have been many different apparatuses specifically designed for assisting in extracting meat shells and the shells of other crustaceans. Most apparatuses of this type are relatively complex, require adjustments according to the sizes of the crustaceans being handled to extract meat therefrom and operate in a substantially programmed manner which does not allow for operational variations according to the problems encountered to obtain substantially complete meat extraction from crustaceans of varying shapes and sizes.

While many of these previously known apparatuses are constructed to function on a substantially production line basis with only one or two operators required to properly feed crustaceans thereto, such production line apparatuses are not highly efficient in the removal of meat from the shells of crustaceans independent of excessive force being applied to the meat and such excessive force results in most of the extracted meat being broken up during the extraction process.

Accordingly, a need exists for a meat extractor for crustaceans which is simple in construction and inexpensive to produce as well as highly efficient in removing substantially all of the meat from within the shells of crustaceans and with the meat removed in a manner such that breaking up of the meat during the extracting process is maintained at a minimum.

2. Description of Related Art

Various different forms of apparatuses including some of the general structural and operational features of the instant invention and/or designed specifically for the extraction of meat from shell fish or crustaceans heretofore have been designed. Examples of these previously known devices are disclosed in U.S. Pat. Nos. 3,156,949; 3,962,752; 4,148,112; 4,202,076 and; 4,286,356.

SUMMARY OF THE INVENTION

The meat extractor of the instant invention incorporates an inverted bottle-like container defining a lower gravity outlet, having opposite side mid-height hand access openings formed therein and including a central downwardly directed liquid spray jet structure mounted in an upper portion for directing a downward jet of liquid through a horizontal zone extending between the access openings.

Suitably opened shell portions of shell fish such as bluecrabs are hand held between the two hands of a work person projecting inwardly through the access openings and the opened shell portions are advantageously held with regard to the spray jet structure in order that intermittent or continuous operation of the latter may be used to flush meat from the opened shell portions. Of course, during operation of the extractor an opened shell portion may be manuvered relative to the spray jet structure in order to accomplish the desired meat extraction process in the most efficient and least time consuming manner.

Although the container itself may be constructed of transparent material so that the meat extraction process being carried out within the container may be viewed from the exterior thereof, the container may be opaque, but an appropriately positioned viewing window will be incorporated therein whereby a work person whose hands extend inwardly through the access openings in the container may view the meat extracting process as the latter is being carried out.

The main object of this invention is to provide a meat extractor for extracting the meat from shell portions of crustaceans.

Another object of this invention is to provide a meat extractor in accordance with preceding object and constructed and operational in a manner whereby a high percentage of the meat within a crustacean shell portion may be removed therefrom with minimal breaking up of the extracted meat.

Still another important object of this invention is to provide a meat extractor which need not be adjusted in order to accomodate different size cut crustacean shell portions.

A further object of this invention is to provide a meat extractor which may be readily used in conjunction with different types of crustaceans.

A final object of this invention to be specifically enumerated herein is to provide a crustacean meat extractor in accordance with the preceding objects and which will conform to conventional forms of manufactured, be a simple construction and easy to use so as to provide a device that will be economically feasible, long lasting and relative trouble free in operation.

These together with other objects and advantages which will become subsequently apparent reside in the details of construction and operation as more fully hereinafter described and that claimed, reference being had to the accompanying drawings forming a part hereof, wherein like numeral refer to like parts throughout.

BRIEF DESCRIPTION OF THE DRAWINGS

FIG. 1 is a perspective view of the meat extractor of the instant invention as seen from the front or work person position side thereof;

FIG. 2 is a slightly enlarged side elevational view of the extractor as seen from the right side of FIG. 1;

FIG. 3 is an enlarged fragmentary horizontal sectional view taken substantially upon the plane indicated by the section line 3—3 of FIG. 1;

FIG. 4 is an enlarged fragmentary vertical sectional view taken substantially upon the plane indicated by the section line 4—4 of FIG. 2;

FIG. 5 is a fragmentary vertical sectional view taken substantially upon the plane indicated by the section line 5—5 of FIG. 4;

FIG. 6 is an enlarged exploded perspective view of a split clamp ring bushing utilized in attaching the inlet end of a discharge tube to the outlet of the enclosure portion of the extractor;

FIG. 7 is a fragmentary enlarged front elevational view of the container portion of the extractor with a central portion of the front peripheral wall being broken away and illustrating a modified form a liquid jet discharge structure having a crayfish tail adapter operatively associated therewith;

FIG. 8 is a fragmentary vertical sectional view taken substantially upon the plane indicated by the section line 8—8 of FIG. 7; and FIG. 9 is a horizontal sectional view taken substantially upon the plane indicated by the section line 9—9 of FIG. 7.

DESCRIPTION OF THE PREFERRED EMBODIMENT

Referring now more specifically to the drawings the numeral 10 generally designates the meat extractor of the instant invention. The meat extractor 10 includes a table-like base referred to in general by the reference numeral 12 from which a container or enclosure structure referred to in general by the reference numeral 14 is removably supported.

The base 12 includes four corner upstanding legs 16, a lower shelf structure 18 extending between and interconnecting the lower end portions of the legs 16, an upper horizontal frame portion 20 extending between and interconnecting the upper ends of legs 16 and an intermediate height shelf structure 22 extending between and interconnecting intermediate height portions 20 of the legs 16.

Various portions of the base 12 are constructed of plastic or other suitable material tubular stock which is readily available at low cost and opposite side portions of the frame portion 20 include work supporting panels 24 supported therefrom. In addition, the shelf structure 22 includes a central opening 26 formed therethrough and an adjustable stop arm 28 is supported from one side portion of the shelf structure 22 as at 30.

The container or enclosure structure 14 embodies an inverted transparent large volume bottle 32 including a reduced diameter lower end outlet neck 34 downwardly received through the opening 26 and the lower portion of the inverted bottle 32 includes bottom wall portions disposed about and diverging upwardly from the outlet neck 34, the bottom wall portion 36 and outlet neck 34 defining a gravity flow extracted meat and liquid outlet.

The bottle 32 is supported from the shelf structure 22 and also between central front to rear extending portions 38 of the frame portion 20, see FIG. 4. The outlet neck 32 has the inlet end of a horizontally rearwardly and downwardly inclined discharge tube 40 supported therefrom through the utilization of a split clamp ring bushing 42 and an adjustable clamp structure 48. The outlet end of the discharge tube 40 includes a downwardly and outwardly inclined baffle 50 supported therefrom for controlling the discharge of crabmeat and liquid from the discharge tube 40 and an appropriate receptacle (not shown) may be supported from the discharge end of the tube 40 or otherwise supported and disposed therebeneath.

The lower gravity outlet portion of the bottle 32 includes a baffle structure referred to in general by the reference numeral 50 supported therein for controlling the flow of extracted meat and liquid from the bottle 32 and establishing a stop for stopping small crustacean body parts which may be accidentally dropped within the bottle 32. In addition, opposite side wall portions of the bottle 32 include access openings 52 formed therein and slotted, resilient annular baffles 54 are supported from the bottle 32 about the opening 52 and are adapted to snuggly engage the wrist areas 56 of the arms of a work person having his or her hands 58 disposed within the bottle 32. Further, the upper forward portion of the bottle 32 includes an inclined planar transparent window 60 incorporated therein over whose upper portion a shielded light 62 is mounted, the light 62 including a male electrical plug 64 operatively associated therewith whereby the light 62 may be electrically connected to a suitable source of electrical potential through the utilization of an extension cord (not shown).

Also, the upper wall 66 of the bottle 32 has a pressurized fluid supply fitting 68 secured therethrough, the inlet end of the fitting 68 having the outlet of a control valve (hose nozzle) 70 operatively connected therewith, the control valve 70 including a lever type acutuator 72 and being operatively connected to a suitable source of water under pressure through a supply hose 74.

The outlet end of the fitting 68 has the inlet end 76 of a water jet discharge nozzle 78 operatively connected therewith and the outlet end 80 of the nozzle 78 is centrally disposed within the bottle 32 slightly above the vertical center of a zone extending between the openings 52. Accordingly, the water jet discharge nozzle 78 is operative to discharge a jet of water downwardly through a horizontal zone extending between the openings 52.

One side of the base 12 has a horizontal front to rear extending operating shaft 82 oscillatibly supported therefrom for angular displacement about a horizontal front to rear extending access and the front end of the operating shaft 82 includes a downwardly directed and resiliently cushioned lever arm 84 supported therefrom, the lower end portion of the arm 84 being engagable with the stop arm 28 to limit swinging movement of the lower end of the arm 84 toward to right as viewed in FIG. 1. The rear end of the shaft 82 includes a generally horizontal lever arm 86 supported therefrom projecting toward the other side of the base 12 and the free end of the lever arm 86 is operatively connected to free end of the lever type actuator 72 through a tension member 88.

Inasmuch as the operating actuator 72 is spring biased upwardly toward a position in which the control valve 70 is closed, a work person standing at the front of the extractor 10 may engage the lever arm 84 with his right knee and displace the lever arm 84 toward to the stop arm 28 in order to exert a downward pull on the free end of the operating actuator 72 whereby the control valve 70 will be opened and a jet discharge of water will be discharged from the discharge nozzle 78.

In operation, the claws and legs of a blue shell crab to have the meat extracted therefrom are removed together with the apron and top shell half of the crab. Then, the crab body is cleaned in the usual manner before picking. Thereafter, the body of the crab is broken in half as is conventional and the body halves may be cut with knives, scissors or other cutting instruments in various manners to expose at least substantially all of the meat containing cavities of the body halves. Then, the cut portions of the body halves may be held between the work person's hands 58 in the manner illustrated in FIG. 4 and the cut body portions may be variously positioned in alignment with the discharge nozzle 78 and the lever arm 84 may be displaced to cause the valve 70 to open. Jets of water will be discharged from the discharge nozzle 78 and flush the meat of the crab from the various open body cavities thereof aligned with the nozzle 78 in a gentle manner. The claws of the crab also may be opened throughout the various portions thereof and similarly cleaned of meat through utilization of jets of water discharged from the nozzle 78. The thin legs of the crabs may have meat extracted therefrom by other means.

It is also to be noted that the claws and the body portions of lobsters may be readily cleaned of meat through the utilization of the extractor 10 and, with attention invited now more specifically to FIGS. 7-9, a crayfish tail 92 may have the meat ejected therefrom through the utilization of a modified form of extractor 10'.

The extractor 10' is substantially identical to the extractor 10, except that the extractor 10' includes a discharge nozzle 78' corresponding to the discharge nozzle 78 but which includes a beveled, and thus sharpened, outlet end 80. In addition, the extractor 10' includes a depending support 94 incorporating a top plate 96 removably supported from a fitting 68' corresponding to the fitting 68 and a bottom plate 98, the plates 98 being interconnected by a plurality of parallel guide rods 100 extending therebetween. In addition, an abutment bracket 102 including a vertically extending plate-like body 104 and upper and lower end rearwardly directed flanges 106 and 108 is provided and the flanges 106 and 108 include short and long front to rear extending slots 110 and 112 formed therein between whose opposite sides the rods 100 are snuggly slidably received. The flanges 106 and 108 thus may be shifted in front to rear directions relative to the rods 100, and the body 104, disposed behind the discharge nozzle 78', may be shifted in a front to rear direction rearwardly of the nozzle 78' and also variably inclined about a horizontal transverse axis.

The bottom plate 98 includes a resilient panel 114 disposed over the upper surface thereof and the underside of the flange 108 includes a forwardly and upwardly inclined V-shaped cutting blade 116 supported therefrom which projects slightly forward of the front side of the body 104.

When a crayfish tail 92 is to have the meat removed therefrom, the tail 92 is positioned with the top side thereof abutted against the body 104 and the head end of the tail 92 disposed immediately above the blade 116. Then, with the tail 92 held in position against the body 104 by the hands 58 engaging opposite sides of the tail 92, the bracket 102 is upwardly and rearwardly displaced until the point of the beveled discharge or outlet end 80' of the nozzle 78' is positioned at the vent 118 on the tail 92. At this point, the tail and bracket 102 are manuevered so that the discharge end 80' enters the vent 118. Then, the right knee of the operator momentarily displaces the lower end of the lever arm corresponding to the lower end of the lever arm 84 to the left to thereby cause a jet discharge of water from the discharge nozzle 78'. This of course immediately ejects the meat of the crayfish tail 92 from the shell thereof. Also, as the meat is being downwardly ejected from the crayfish shell 92, the blade 116 opens and strips clean the vein of the crayfish tail 92. Thus, the vein of the crayfish tail is opened and cleaned at the same time the meat is ejected from the shell of the tail 92.

Although the extractor 10 is illustrated and described herein above as incorporating an inverted transparent bottle 32 modified to incorporate the transparent planar window 60 therein, it is to be noted that a container of similar design could be made specifically for the extractor 10. Further, other forms of bases and means for supporting the container 14 from other forms of bases may be used. Still further, other forms of actuators such as a toe operated actuator could be used for controlling the valve 70. Still further, the valve 70 could comprise a dual fluid flow controlling valve and also be operatively associated with a supply of air under pressure in order that water or air under pressure may be used to flush meat from crab, lobster and crayfish shell portions.

It is also pointed out that in most instances momentary operation of the valve 70 to discharge a jet water under pressure from the nozzle 78 or the nozzle 78' is all that it required to perform a given meat extracting operation for a particular crustacean shell cavity. Accordingly, meat may be extracted through the utilization of a minimum amount of water and there is a minimum amount of dilution of the taste of the normal juices of the meat being extracted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A crustacean meat extractor for efficiently and quickly removing the meat from crustacean shell cavities, said extractor including an enclosure having peripheral side wall means and at least substantially closed top and bottom portions, said side wall means including opposite side portions defining access openings formed therethrough each of sufficient size to receive a human adult hand therethrough to the wrist, said bottom portion defining a gravity flow extracted meat and liquid outlet, and downwardly directed liquid jet discharge means centrally disposed in said upper portion for directing a liquid jet discharge downwardly through a horizontal zone extending between said access openings.

2. The meat extractor of claim 1 including generally radially slotted resilient annular baffles secured to said enclosure and projecting radially inwardly of said axis openings.

3. The meat extractor of claim 1 wherein said gravity flow liquid outlet includes a central outlet neck and upwardly and outwardly inclined bottom wall portions disposed about said outlet neck.

4. The meat extractor of claim 1 including supply means for supplying liquid under pressure to said liquid jet discharge means, said supply means including a selectively operable fluid flow control valve operatively associated therewith and control valve operating means disposed exteriorly of said enclosure for selective intermediate manual actuation thereof.

5. The meat extractor of claim 1 wherein an upper portion of said enclosure includes an inclined transparent window portion through which the central portion of said zone may be readily viewed from the exterior of said enclosure.

6. The extractor of claim 5 including light emitting means disposed exteriorly of said window portion and operative to cast light through said window portion from the outer side thereof.

7. The extractor of claim 1 including abutment means guidingly mounted in said enclosure for limited horizontal reciprocation along a path disposed generally normal to a vertical plane containing said access openings, limited vertical shifting in said plane and limited angular displacement about a horizontal axis generally paralleling said plane, said abutment means including an upstanding abutment surface facing in a direction toward said jet discharge means and in a direction generally normal to said plane, said abutment surface being adapted to have a vertically disposed crustacea tail removably manually supported thereagainst with the head end of the tail lowermost and the underside of the tail facing toward said jet discharge means, said abutment means being shiftable relative to said jet discharge means in a manner adapting said jet discharge means to be registered with and penetrate the vent of said crustacea tail.

8. The extractor of claim 7 wherein said abutment surface includes a lower extremity outwardly from which a sharpened pointed blade projects in the direction in which said surface faces, said blade being adapted to open and clean the vein of crayfish tail meat forced from a crayfish tail whose vent has been penetrated by said liquid jet discharge means.

9. The method of extracting meat from a crustacea tail, said method including penetrating the vent of a crustacea tail, from the end of the tail remote from the head end thereof with a small diameter liquid jet discharge means, supporting the crustacea tail stationary relative to the liquid jet discharge means and with a sharpened blade tip positioned at the head end of the vein of the crustacea tail and projecting laterally of the tail inward from the backside thereof and maintained stationary relative to the shell of the crustacea tail, and causing a jet discharge of liquid to be discharged from said liquid jet discharge means into the vent of the crustacea tail sufficient to eject the meat of the crustacea shell from the later in a longitudinal direction such that the sharpened blade tip will open and strip substantially clean the vein of the crayfish tail as it is ejected from the shell.

10. The method of extracting meat from a crustacea tail, said method including providing an abutment surface against which the upper or backside of a crustacea tail shell may be stationarily positioned and wherein a sharpened blade tip projects slightly outward of said surface, stationarily positioning the backside of a crustacea tail shell on said surface with said sharpened blade tip positioned at the head end of the vein of the crustacea shell, penetrating the vent on the underside of the crayfish tail with a small diameter liquid discharge jet, and causing a jet of liquid under pressure to be discharged from said discharge jet while the crustacea tail shell is held stationary relative to said surface and blade tip, the jet of liquid under pressure discharged into the crustacea tail shell vent causing the meat of the crustacea tail to be longitudinally ejected therefrom through the open end of the crustacea shell and allowing, simultaneously, the sharpened blade point to open and substantially strip clean the vein of the crustacea tail meat as the meat is ejected from the shell.

* * * * *